US012305598B2

(12) United States Patent
Lucas et al.

(10) Patent No.: US 12,305,598 B2
(45) Date of Patent: May 20, 2025

(54) HIGH-PRESSURE GDI PUMP WITH LOW-PRESSURE BYPASS

(71) Applicant: Stanadyne Operating Company LLC, Jacksonville, NC (US)

(72) Inventors: Robert G. Lucas, Swansboro, NC (US); Michael Hornby, Emerald Isle, NC (US); Srinu Gunturu, Jacksonville, NC (US)

(73) Assignee: Stanadyne Operating Company LLC, Jacksonville, NC (US)

( * ) Notice: Subject to any disclaimer, the term of this patent is extended or adjusted under 35 U.S.C. 154(b) by 33 days.

(21) Appl. No.: 18/040,590

(22) PCT Filed: Aug. 4, 2021

(86) PCT No.: PCT/US2021/044504

§ 371 (c)(1),
(2) Date: Feb. 3, 2023

(87) PCT Pub. No.: WO2022/031820

PCT Pub. Date: Feb. 10, 2022

(65) Prior Publication Data

US 2023/0313770 A1 Oct. 5, 2023

Related U.S. Application Data

(60) Provisional application No. 63/060,871, filed on Aug. 4, 2020.

(51) Int. Cl.
*F02M 59/36* (2006.01)
*F02M 37/00* (2006.01)
(Continued)

(52) U.S. Cl.
CPC ...... *F02M 37/0041* (2013.01); *F02M 59/027* (2013.01); *F02M 59/368* (2013.01); *F02M 69/465* (2013.01); *F04B 19/04* (2013.01)

(58) Field of Classification Search
CPC .. F02M 59/368; F02M 59/027; F02M 55/025; F02M 69/465; F02M 59/485;
(Continued)

(56) References Cited

U.S. PATENT DOCUMENTS

| | | | | |
|---|---|---|---|---|
| 3,938,911 A | | 2/1976 | Salzgeber et al. | |
| 4,757,795 A | * | 7/1988 | Kelly ................ | F02M 41/1411 123/506 |

(Continued)

FOREIGN PATENT DOCUMENTS

| | | | |
|---|---|---|---|
| EP | 2541039 A1 | 1/2013 | |
| KR | 20180077525 A | 7/2018 | |

OTHER PUBLICATIONS

PCT International Search Report and Written Opinion for International Application No. PCT/US2021/044504 filed Aug. 4, 2021; Date of Mailing: Oct. 21, 2021; 11 pgs.

(Continued)

*Primary Examiner* — Dominick L Plakkoottam
(74) *Attorney, Agent, or Firm* — Alix, Yale & Ristas, LLP

(57) ABSTRACT

A high-pressure fuel supply pump for a fuel system that supplies a high-pressure fuel injection (GDI) apparatus and a low-pressure fuel injection (PFI) apparatus incorporates an inlet check valve to isolate a low-pressure fuel feed channel in the pump from pressure fluctuations at the inlet of an inlet control valve. Upstream of the inlet check valve, the low-pressure fuel feed channel is connected to a seal chamber surrounding the pumping plunger. Circulating fresh low-pressure fuel through the seal chamber ensures that the pumping plunger and the clearance between the plunger and the pump bore are cooled and lubricated with fuel, even when high pressure fuel is not produced by the high-pressure pump. The low-pressure fuel feed channel is connected to the low-pressure PFI outlet downstream of the seal chamber.

(Continued)

This pump configuration provides stable source of low-pressure fuel for a PFI system.

6 Claims, 9 Drawing Sheets

(51) Int. Cl.
*F02M 59/02* (2006.01)
*F02M 69/46* (2006.01)
*F04B 19/04* (2006.01)

(58) Field of Classification Search
CPC ............. F02M 37/0041; F02M 59/366; F02M 63/0285; F04B 19/04
See application file for complete search history.

(56) References Cited

U.S. PATENT DOCUMENTS

| | | | | |
|---|---|---|---|---|
| 6,494,182 | B1 | 12/2002 | Djordjevic | |
| 6,694,950 | B2 | 2/2004 | Djordjevic | |
| 7,314,351 | B2 | 1/2008 | Kuroda | |
| 10,294,906 | B2 | 5/2019 | Lucas | |
| 10,450,992 | B2 | 10/2019 | Pellini | |
| 10,598,118 | B2 * | 3/2020 | Nakaoka | F02M 59/442 |
| 2004/0084028 | A1 * | 5/2004 | Zdroik | F02M 69/465 123/456 |
| 2004/0123841 | A1 | 7/2004 | Kelly | |
| 2004/0197216 | A1 * | 10/2004 | Kuroda | F04B 1/0404 417/470 |
| 2009/0320796 | A1 * | 12/2009 | Kojima | F02M 63/029 123/510 |
| 2012/0312278 | A1 * | 12/2012 | Usui | F02M 55/04 123/446 |
| 2015/0300339 | A1 * | 10/2015 | Morel | F16K 17/044 417/559 |
| 2016/0010607 | A1 * | 1/2016 | Lucas | F02M 37/0058 417/505 |
| 2017/0089311 | A1 * | 3/2017 | Lucas | F02M 59/025 |
| 2017/0167450 | A1 * | 6/2017 | Spakowski | F02M 37/08 |
| 2017/0292485 | A1 * | 10/2017 | Nah | F02M 59/02 |
| 2017/0306880 | A1 * | 10/2017 | Nakaoka | F02M 59/442 |
| 2019/0128208 | A1 * | 5/2019 | Pellini | F02D 41/3094 |
| 2019/0301414 | A1 * | 10/2019 | Usui | F02M 63/005 |

OTHER PUBLICATIONS

PCT International Preliminary Report on Patentability and Written Opinion of the International Searching Authority for International Application No. PCT/2021/044504 filed on Aug. 4, 2021, Date of Mailing: Feb. 16, 2023; 7pgs.

* cited by examiner

HIGH-PRESSURE GDI PUMP WITH LOW-PRESSURE BYPASS

BACKGROUND

The present disclosure relates to a fuel supply pump that generates pressurized fuel for a direct injection system and a low-pressure fuel outlet hydraulically isolated from the high-pressure pumping mechanism.

High-pressure fuel supply pumps are used to supply pressurized fuel to gasoline direct injection (GDI) systems for motor vehicles. In a GDI system, a pumping mechanism is configured to deliver pressurized fuel to a fuel accumulator connected to fuel injectors arranged in each engine cylinder. Under control of an engine control unit (ECU) the fuel injectors release highly pressurized fuel directly into the engine cylinders, where the fuel-air mixture is ignited. The precision with which fuel is released through the fuel injectors plays a role in the fuel economy, performance, and emissions of the engine. The consistency of pressure in the fuel accumulator, or "common rail" impacts the accuracy of the quantity, rate of flow, and timing of fuel injection, so high-pressure fuel supply pumps are designed to regulate the quantity of pressurized fuel delivered to the common rail so that fuel pressure in the common rail stays within a pre-defined range of pressures.

Recent requirements for vehicle manufacturers to lower emissions have led to gasoline engines being equipped with both high-pressure GDI and low-pressure port injection PFI systems. In terms of emissions of nitrogen oxides and particulates, port fuel injection system is superior to a GDI system in low load and at low engine speeds, while the GDI system is superior when the engine is under load or at high engine speeds. Both the GDI and port injection systems need a source of fuel at a pre-determined, regulated pressure that is as stable as possible.

High-pressure fuel supply pumps for GDI systems receive fuel at low-pressure (3-6 bar) from a fuel supply pump typically arranged in or near a fuel tank. Most high-pressure fuel supply pumps pressurize fuel using a plunger or piston that reciprocates in a bore to cyclically increase and decrease the volume of a pumping chamber. An inlet valve allows fuel to flow into the pumping chamber as the volume of the pumping chamber is expanded when the plunger is retracted (the intake stroke), and an outlet check valve is opened by the pressurized fuel as the pumping chamber volume is reduced when the plunger is advanced (the pumping stroke). To maintain consistent pressure in the common rail, the quantity of fuel pressurized by the pumping mechanism must be matched to the fuel consumed by the GDI system. An electronically controlled inlet valve is used to regulate the quantity of fuel pressurized during each pumping stroke of the high-pressure pumping mechanism by remaining open during all or a portion of the pumping stroke. When the intake valve is open, fuel that would otherwise be pressurized is instead returned to the inlet of the pump without being pressurized, which is known to generate pressure pulses at the intake of the fuel pump. GDI fuel pumps are equipped with damping mechanisms to reduce these pressure pulses at the low-pressure inlet area of the pump, but they cannot be entirely eliminated.

High pressure gasoline direct injection (GDI) pumps include a plunger seal surrounding a stem portion of the plunger extending between the pump bore and the driven end of the plunger. The GDI pump is typically mounted to an internal combustion engine so that the driven end of the plunger and an associated cam follower extend into a gallery through which engine oil is circulated to lubricate the cam, cam follower and driven end of the plunger which translate rotation of an engine shaft into axial reciprocation of the plunger. The plunger has a sealing diameter that is closely received within the pump bore, with a diametric clearance between the outside of the plunger and the inside of the bore on the order of 7-12 microns. It is known that a small amount of fuel is pushed through this diametric clearance when high pressures are generated in the pumping (compression) chamber of the pump. This "leakage flow" is known to lubricate and cool the pumping plunger and a film of liquid fuel between the plunger and pump bore is critical to prevent plunger abrasion and possible seizure. The plunger seal separates a seal chamber containing the leakage flow of fuel being pumped from the engine oil in the gallery. It is common for the stem portion of the plunger to have a diameter where the stem passes through the plunger seal that is smaller than the sealing diameter of the plunger in the pump bore. This difference in diameter results in a "pumping effect" as the plunger reciprocates in the seal chamber. The pumping effect of the plunger can also generate undesirable pressure pulses in regions of the pump connected to the seal chamber. It is known to return leakage flow from the seal chamber to the fuel tank by a return flow path that is separate from the low-pressure fuel flow supplied to the pump, which requires additional fuel piping and undesirably provide additional locations for fuel leakage.

Some operating conditions of an internal combustion engine do not call for high pressure fuel, so the inlet control valve is held open and fuel is not pressurized by the pump. Under these conditions, there may be insufficient leakage flow to cool and lubricate the pumping plunger. It is known to circulate low pressure fuel through the seal chamber of a GDI pump to ensure that the plunger is cooled and lubricated even when high pressure fuel is not being generated by the pump. For example, U.S. Pat. No. 9,145,860 discloses a GDI fuel pump where low-pressure fuel is circulated through the seal chamber in a low-pressure fuel feed path that is in fluid communication with the damper chamber of the pump before being delivered to a low-pressure outlet for a PFI system.

FIG. 1 is a schematic illustration of a prior art high-pressure fuel supply pump 1, with a dashed line representing the body of the pump 1. A low-pressure fuel supply pump 2 pressurizes fuel from a fuel tank to a pressure of 3-6 bar, which is delivered to an inlet of the high-pressure fuel supply pump 1. It is conventional to arrange a check valve somewhere between the low-pressure fuel supply pump 2 and the high-pressure fuel supply pump 1 to prevent pressure pulses from the high-pressure pump from propagating in the fuel line and generating noise. In the prior art pump 1, a check valve 3 is arranged between the low-pressure inlet of the high-pressure fuel supply pump 1 and a low-pressure fuel accumulator equipped with a damping mechanism, which may be referred to as a damper chamber 4. An inlet control valve 5 controls the quantity of fuel pressurized by the pumping plunger 8 by controlling closure of a pump inlet check valve 5. Fuel that is not pressurized is returned to the damper chamber 4 of the high-pressure fuel supply pump 1 by a passage 10, where some of the pressure pulse is absorbed in the damper chamber 4 as is known in the art.

The check valve 3 is arranged to prevent transmission of pressure pulses in the damper chamber 4 upstream toward the low-pressure fuel supply pump 2. A low-pressure fuel path 11 is branched from passage 10 downstream of the check valve 3 and in communication with the damper chamber 4. Low-pressure fuel passes through a seal chamber of the pumping plunger 8 and an outlet orifice 12, leaving a low-pressure outlet in the body of the high-pressure fuel supply pump 1 for use by a PFI system. The orifice 12 is a flow restriction that reduces fluctuation of pressure in low-pressure fuel delivered to the PFI system. However, since the low-pressure path 11 is in fluid communication with the damper chamber 4 and inlet control valve 5, the low-pressure path 11 is exposed to pressure fluctuations caused by fuel returned to the low-pressure accumulator 4 when the inlet control valve 5 acts to reduce the quantity of high-pressure fuel supplied to the spark ignition direct injection (SIDI) rail.

GDI pumps are configured to generate very high-pressures up to 500 bar. To generate such high-pressures, the outside diameter of the pumping plunger is very tightly received in the bore within which the plunger 8 reciprocates. When the GDI pump is compressing fuel to high-pressures, some fuel is forced between the outside diameter of the plunger and the inside diameter of the bore, which lubricates and cools the pumping plunger to prevent seizure. The pump includes a seal surrounding the driven end of the pumping plunger to prevent this fuel from leaving the pump, as is known in the art. A seal chamber is defined above the plunger seal and is typically connected to the low-pressure region of the pump. The high-pressure fuel supply pump 1 of FIG. 1 uses a pumping plunger 8 with a larger diameter at the pumping end than at the driven end of the plunger. This plunger configuration results in a cyclical fluctuation in the volume of the seal control chamber and a corresponding pressure fluctuation in the seal chamber as the plunger 8 reciprocates.

In an engine equipped with direct injection and port injection systems, there are times when there is no demand for high-pressure fuel by the direct injection system, so all the fuel flowing into the pumping chamber is returned to the damper chamber 4 through the inlet control valve 5. This condition produces the largest pressure fluctuations in the low-pressure side of the pump 1 and also coincides with the need to supply low-pressure fuel to the PFI system. The PFI system operates at low-pressure, so the pressure fluctuations caused by no demand for high-pressure fuel can represent a significant proportion of the operating pressure of the PFI system, resulting in inaccurate fuel metering by the PFI system. In the high-pressure fuel supply pump configuration of FIG. 1, the pressure pulses are damped by a flow restriction 12 at the low-pressure outlet and by the damping mechanism in the low-pressure accumulator 4, but remain significant as shown in the upper line of FIG. 4.

When the inlet control valve 5 remains open in no-demand for high-pressure fuel situation, there is little or no fuel passing between the outside diameter of the plunger and the inside diameter of the pump bore. This can result in loss of a film of fuel between the plunger and bore, and seizure of the plunger to the bore causing failure of the pump. Circulating low-pressure fuel through the seal chamber of the pump 1 prevents loss of fuel film by providing a flow of fuel to the seal chamber even when the engine is not calling for high-pressure fuel and the inlet control valve 5 remains open for an extended period.

Port fuel injection systems operate at much lower pressures than the GDI systems and can be supplied directly from the low-pressure fuel supply pump that feeds low-pressure fuel to the high-pressure fuel supply pump. The addition of a port fuel injection (PFI) system to a GDI system to improve emissions is driving demand for a stable pressure low-pressure fuel outlet on the GDI pump for use by the PFI system.

There is a need for a GDI pump with a stable low-pressure fuel outlet for use by a PFI system.

SUMMARY OF THE INVENTION

In some embodiments, a high-pressure fuel supply pump for a fuel system that supplies a high-pressure fuel injection (GDI) apparatus and a low-pressure fuel injection (PFI) apparatus incorporates an inlet check valve to isolate a low-pressure fuel feed channel in the pump from pressure fluctuations at a damper chamber or fuel path on the inlet side of an inlet control valve. Upstream of the inlet check valve, the low-pressure fuel feed channel is connected to the seal chamber surrounding the pumping plunger. Circulating fresh low-pressure fuel through the seal chamber ensures that the pumping plunger and the clearance between the plunger and the pump bore are cooled and lubricated with fuel, even when high pressure fuel is not produced by the high-pressure pump. The low-pressure fuel feed channel is connected to the low-pressure PFI outlet downstream of the seal chamber. The disclosed pump configuration separates a low-pressure fuel feed path through a high-pressure fuel pump from pressure fluctuations generated by the inlet control valve, while ensuring that the pumping plunger is cooled and lubricated even when high pressure fuel is not being produced by the pump.

In some embodiments, a high-pressure fuel pump may incorporate a pumping plunger having a high-pressure sealing diameter D within the pump bore equal to a low-pressure sealing diameter d where the plunger passes through the plunger seal. Alternatively, diameter d may be selected to be less than 30% smaller than diameter D. Reducing or eliminating the difference between the high-pressure sealing diameter D and the low-pressure sealing diameter d of the pumping plunger reduces a pumping effect of the lower end of the pumping plunger as it reciprocates in the seal chamber and reduces pressure pulsations in the low pressure PFI outlet downstream of the seal chamber.

An advantage of the disclosed low pressure bypass configuration is that pressure pulsations within the pump are prevented from entering the low-pressure fuel flow path by a check valve upstream of the low-pressure fuel flow path leading to the low-pressure fuel outlet on the GDI pump. In a fuel pump such as illustrated in FIG. 1, the pressure pulsations are allowed to propagate in the low-pressure fuel low path and can be reduced by strategies such as a restricted outlet but cannot be eliminated.

One specific embodiment of a high-pressure fuel supply pump for an internal combustion engine fuel system that includes a high-pressure fuel injection apparatus, a low-pressure fuel injection apparatus, a low-pressure fuel supply pump, and a low-pressure feed line extending from the low-pressure fuel supply pump, includes a plunger reciprocating in a pumping chamber and driven by a cam to generate high-pressure fuel, a low-pressure inlet connection receiving low-pressure fuel from the low-pressure fuel line, a first low-pressure fuel flow path from the low-pressure inlet connection communicating with a damper chamber and a solenoid driven flow control valve assembly arranged to regulate a quantity of fuel pressurized by the plunger. The pump includes a check valve between the low-pressure inlet connection and the first low-pressure fuel flow path, the check valve arranged to close against fuel flow toward the low-pressure inlet connection. The pump includes a second low-pressure fuel flow path from the low-pressure inlet connection upstream of the check valve, the second low-pressure fuel flow path communicating first with a low-pressure seal chamber region around the plunger and then to a low-pressure fuel outlet. In this embodiment of the pump, the second low pressure fuel flow path is fluidly separated from the damper chamber and the flow control valve from the low-pressure inlet connection to the low-pressure fuel outlet and low-pressure fuel is circulated through the low-pressure seal chamber before leaving the fuel supply pump at the low-pressure fuel outlet.

This combination of features substantially eliminates pressure pulses at a low-pressure outlet on a high-pressure GDI pump for use by a low-pressure PFI system.

DETAILED DESCRIPTION

Figure 1:
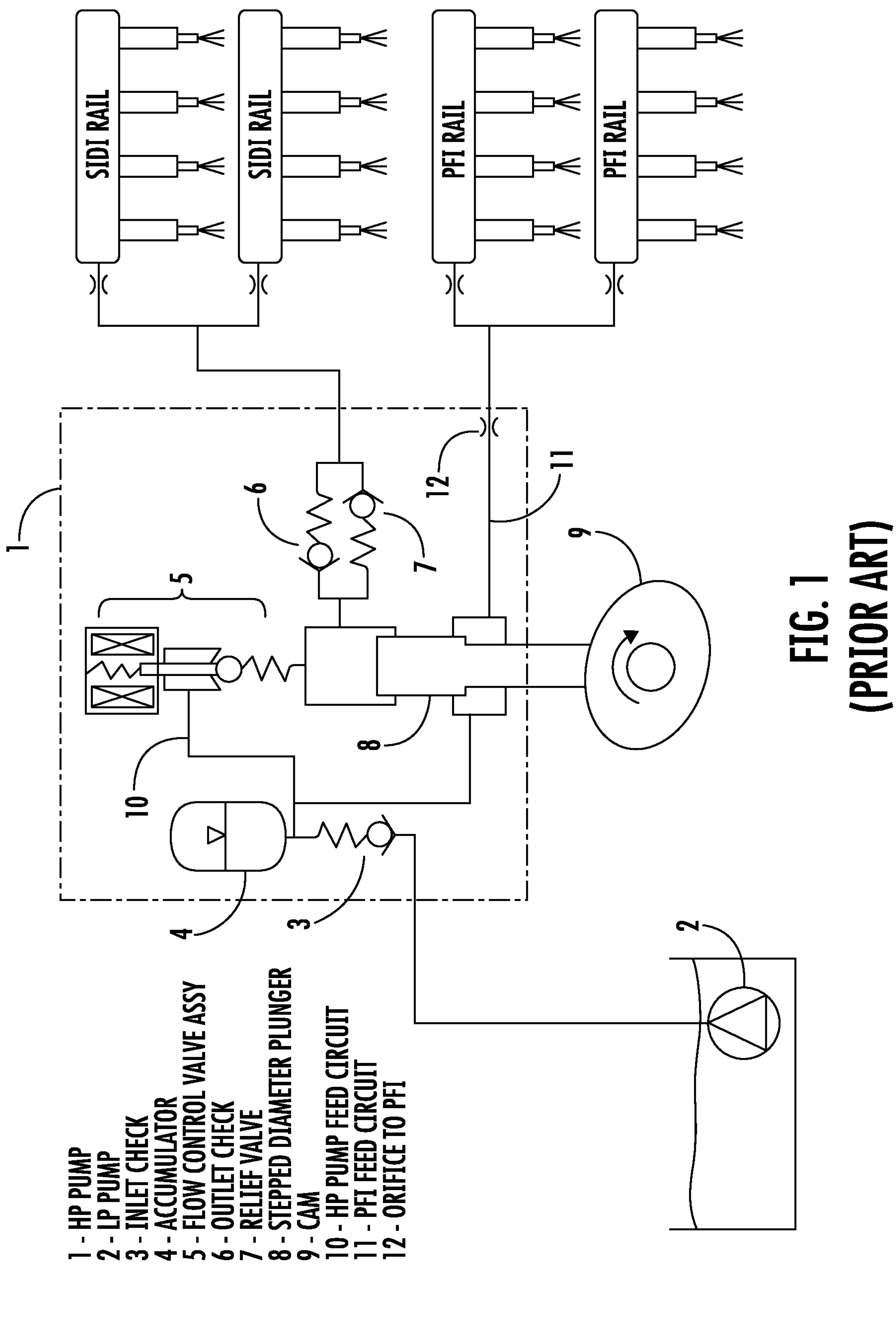
FIG. 1 (PRIOR ART)
FIG. 1 is a schematic illustration of a prior art high-pressure fuel supply pump having a low-pressure outlet connected to the pressure damping chamber of the high-pressure pump via a seal chamber of the pumping plunger and a restricted outlet orifice to a PFI accumulator.

Embodiments of a high-pressure fuel supply pump with a stable low-pressure outlet will be described with reference to FIGS. 2-9. In the description, the term "upstream" refers to a direction corresponding to fuel flow toward the fuel tank, while the term "downstream" refers to a direction corresponding to fuel flow away from the fuel tank. FIG. 2 illustrates an alternative embodiment of a high-pressure fuel supply pump 20 according to aspects of the disclosure. Many devices and/or components shown in FIG. 2 are the same as devices and/or components shown in FIG. 1. Therefore, for the sake of brevity, devices and/or components of the high-pressure fuel supply pump 1 and system of FIG. 1 that are included in the high-pressure fuel supply pump 20 and system of FIG. 2 are labeled the same and the description of these devices and components is omitted from the description of FIG. 2. The high-pressure fuel supply pump 20 of FIG. 2 differs from the high-pressure fuel supply pump 1 of FIG. 1 in that the low-pressure fuel supply line to the pump 20 branches at a low pressure inlet connection 104 outside the pump body and low-pressure fuel to be supplied to the PFI outlet enters the pump body through a dedicated low-pressure fuel inlet upstream of the check valve 3. The check valve 3 is arranged to allow fuel to flow only in the direction of the high-pressure fuel supply pump 20 and closes against pulses of fuel flowing back toward the low-pressure fuel supply pump 2. This isolates the low-pressure fuel supply path 11 in the pump body from the pressure pulses present in the low-pressure side of the pump 20 (which includes the damper chamber 4 and inlet control valve 5). The high-pressure fuel supply pump 20 of FIG. 2 also employs a pumping plunger 8 having the same diameter D at the pumping end and d where the plunger 8 passes through the plunger seal. This eliminates cyclical fluctuation in the volume of the seal chamber 132 and reduces pressure fluctuations in the low-pressure fuel supply path 11, as shown in the lower line of FIG. 4. In the high-pressure fuel supply pump 20 of FIG. 2, the low-pressure fuel supply line to the pump 1 branches outside the body of the pump, with the check valve 3 and branch at a low pressure inlet connection 104 outside the body of the pump 1. In this configuration, low-pressure fuel enters the pump body at two separate low-pressure inlets.

Figure 2:
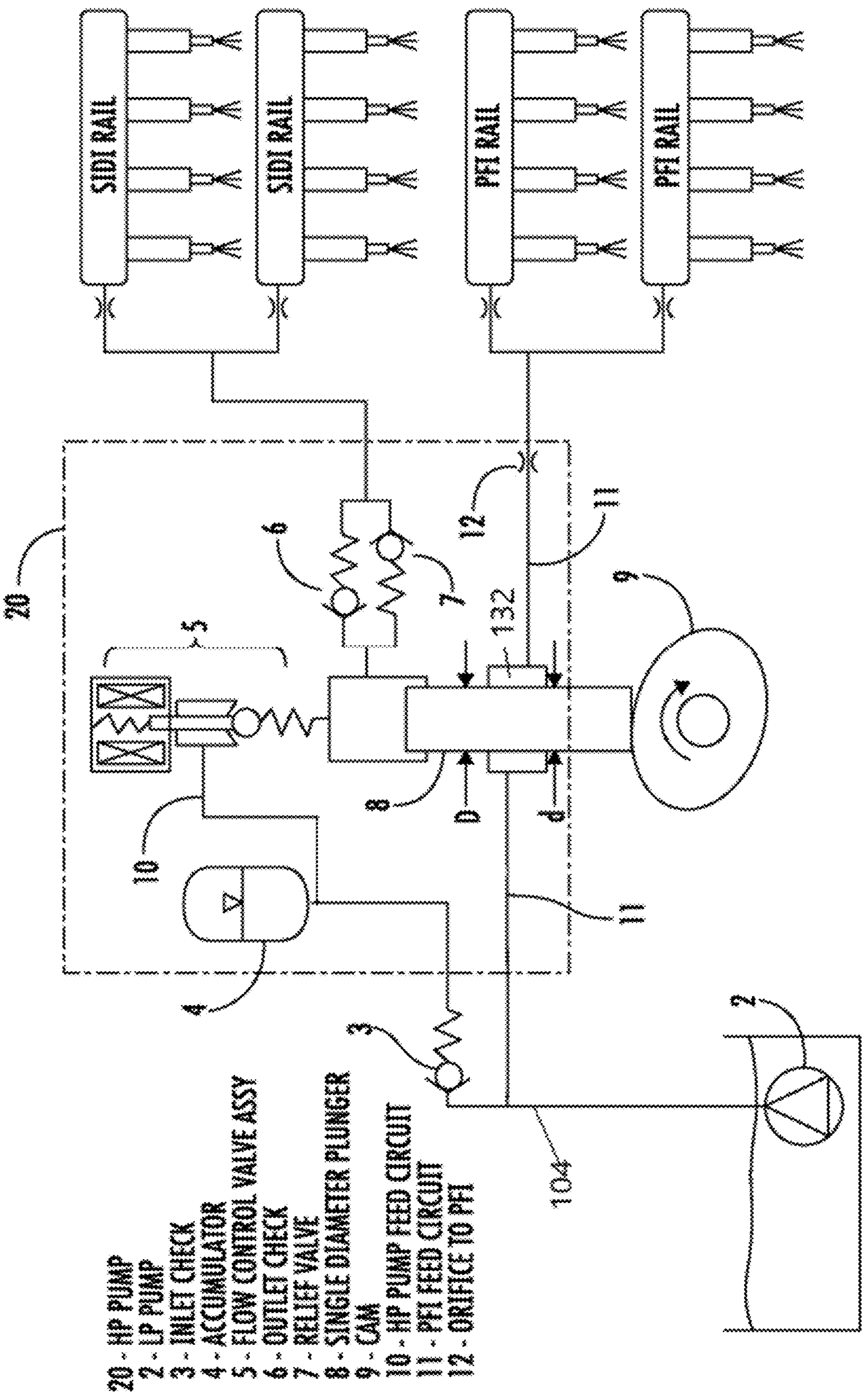
FIG. 2 is a schematic illustration of a first embodiment of a high-pressure fuel supply pump according to aspects of the disclosure, where the low-pressure fuel is delivered to a separate low-pressure inlet on the body of the high-pressure pump and passes through the seal chamber of the pumping plunger and an optional restricted outlet orifice to a PFI accumulator.
Figure 3:
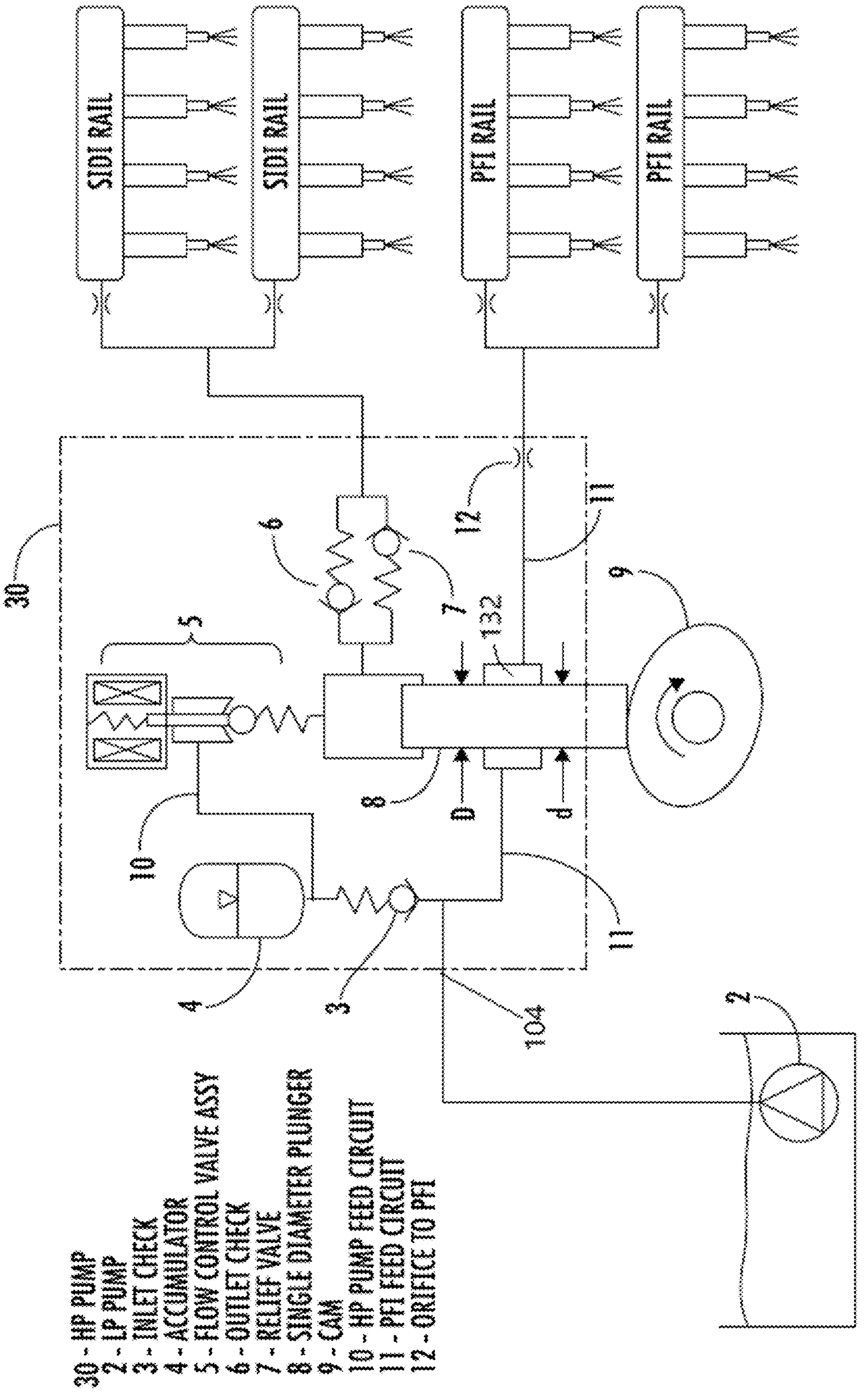
FIG. 3 is a schematic illustration of a second embodiment of a high-pressure fuel supply pump according to aspects of the disclosure having a single low-pressure fuel inlet, where the low-pressure fuel feed path is connected upstream of an inlet check valve and fuel passes through the seal chamber of the pumping plunger and an optional restricted outlet orifice to a PFI accumulator.

FIG. 3 illustrates a further alternative embodiment of a high-pressure fuel supply pump 30 according to aspects of the disclosure. Many devices and/or components shown in FIG. 3 are the same as devices and/or components shown in FIGS. 1 and 2. Therefore, for the sake of brevity, devices and/or components of the high-pressure fuel supply pump and system of FIGS. 1 and 2 that are included in the high-pressure fuel supply pump 30 and system of FIG. 3 are labeled the same and the description of these devices and components is omitted from the description of FIG. 3. In FIG. 3, low-pressure fuel enters the body of the high-pressure fuel supply pump 30 at a single low pressure inlet connection 104. The low-pressure fuel flow branches inside the body of the high-pressure fuel supply pump 30 upstream of the check valve 3, isolating the low-pressure fuel supply path 11 from pressure fluctuations present in the damper chamber 4 as previously described. The pump of FIG. 3 also employs a pumping plunger 8 with the same diameter D at the pumping end and d where the plunger passes through the plunger seal to reduce pressure fluctuations in the seal chamber 132.

While the pump embodiments of FIGS. 2 and 3 illustrate a pumping plunger with the same high-pressure sealing diameter D at the upper end of the plunger 8 and low-pressure sealing diameter d where the lower end of the plunger passes through the plunger seal, it is possible to limit the "pumping" effect of the reciprocating plunger by limiting the difference in these diameters to less than 30% of the high-pressure sealing diameter D.

Delivering low-pressure fuel to the PFI system through the seal chamber maintains cooling and lubrication of the plunger, even when there is no demand for high-pressure fuel and the inlet control valve remains open for an extended time.

Figure 4:
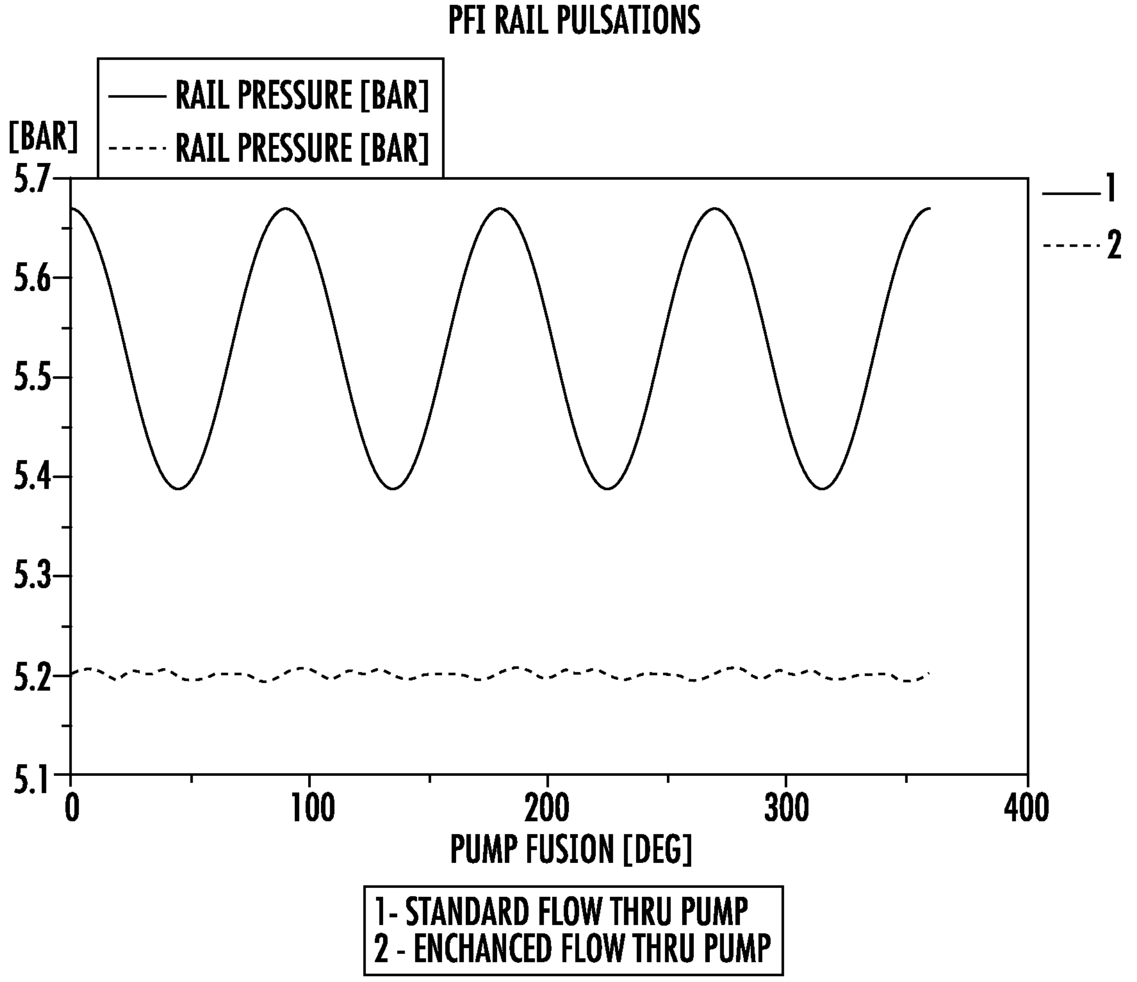
FIG. 4 graphically illustrates pressure pulsations at the low-pressure outlet to the PFI accumulator for the prior art high-pressure fuel supply pump of FIG. 1, compared to the disclosed high-pressure fuel supply pumps of FIGS. 2 and 3.

FIG. 4 graphically compares the pressure fluctuations at the PFI system of the prior art pump 1 embodiment of FIG. 1 with the pump embodiments 20, 30 of FIGS. 2 and 3. Pressure fluctuations at the PFI system are dramatically reduced in a high-pressure fuel supply pump that includes a check valve upstream of a low-pressure fuel supply path to the PFI system to isolate the low-pressure fuel supply path from pressure fluctuations at the low-pressure intake side of a GDI pump. A pumping plunger 8 having a constant diameter from the pumping end through the plunger seal further reduces pressure fluctuations at the PFI outlet. FIGS. 2 and 3 illustrate an optional restricted orifice 12 at the PFI outlet. A restricted orifice at this location may be used to prevent propagation of pressure fluctuations in the PFI outlet and fuel lines to the PFI system, but are not necessary if the low-pressure fuel path is isolated from the inlet side of the high pressure pump and a constant diameter plunger is employed. FIG. 4 illustrates peak to peak pressure pulsations at the low pressure outlet 108 of less than 10 Kpa.

FIGS. 5-9 illustrate a GDI pump 100 configured according to FIG. 3. The GDI pump 100 has a pump body 102 including a low-pressure fuel inlet 104 receiving fuel from a low-pressure fuel supply pump, a high-pressure fuel outlet 106, and a low-pressure outlet 108. A solenoid-controlled inlet valve 110 is arranged on the top of the pump body 102. The inlet valve 110 is operated as previously described to control the quantity of fuel pressurized by the GDI pump 100 for delivery to a high-pressure GDI fuel injection system through high-pressure fuel outlet 106. A damper chamber 112 is connected to a side of the pump body 102 and includes one or more damper assemblies configured to absorb pressure fluctuations as is known in the art. A mounting flange 114 is welded to a lower end of the pump body 102 and includes openings for fasteners to secure the pump 100 to an internal combustion engine (not shown). The lower end of the pump 100 extends into the engine so that a cam mounted to an engine shaft reciprocates the plunger as is known in the art.

Figure 5:
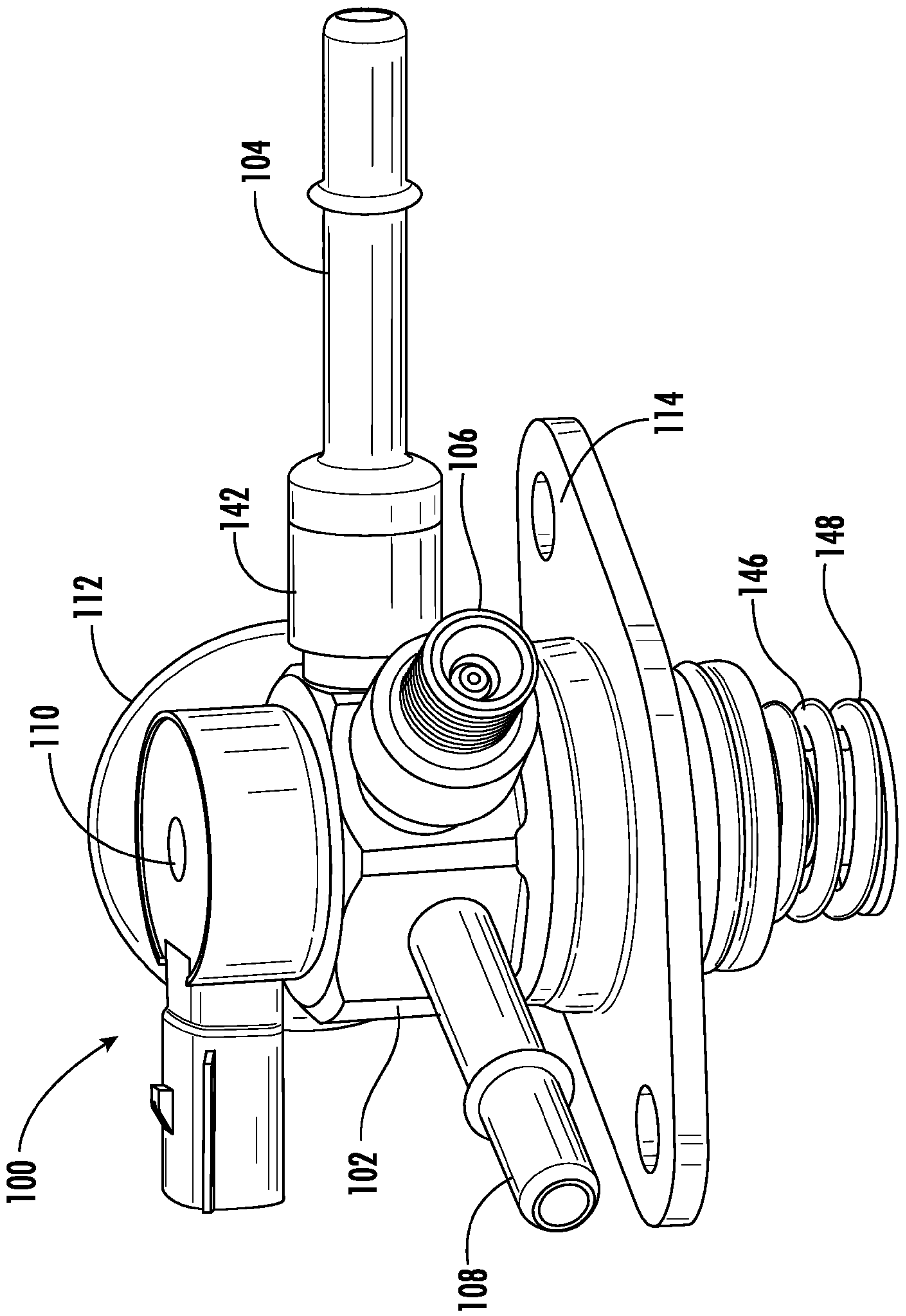
FIG. 5 is an exterior perspective view of an embodiment of a high-pressure fuel pump incorporating a low-pressure fuel outlet according to aspects of the disclosure.
Figure 6:
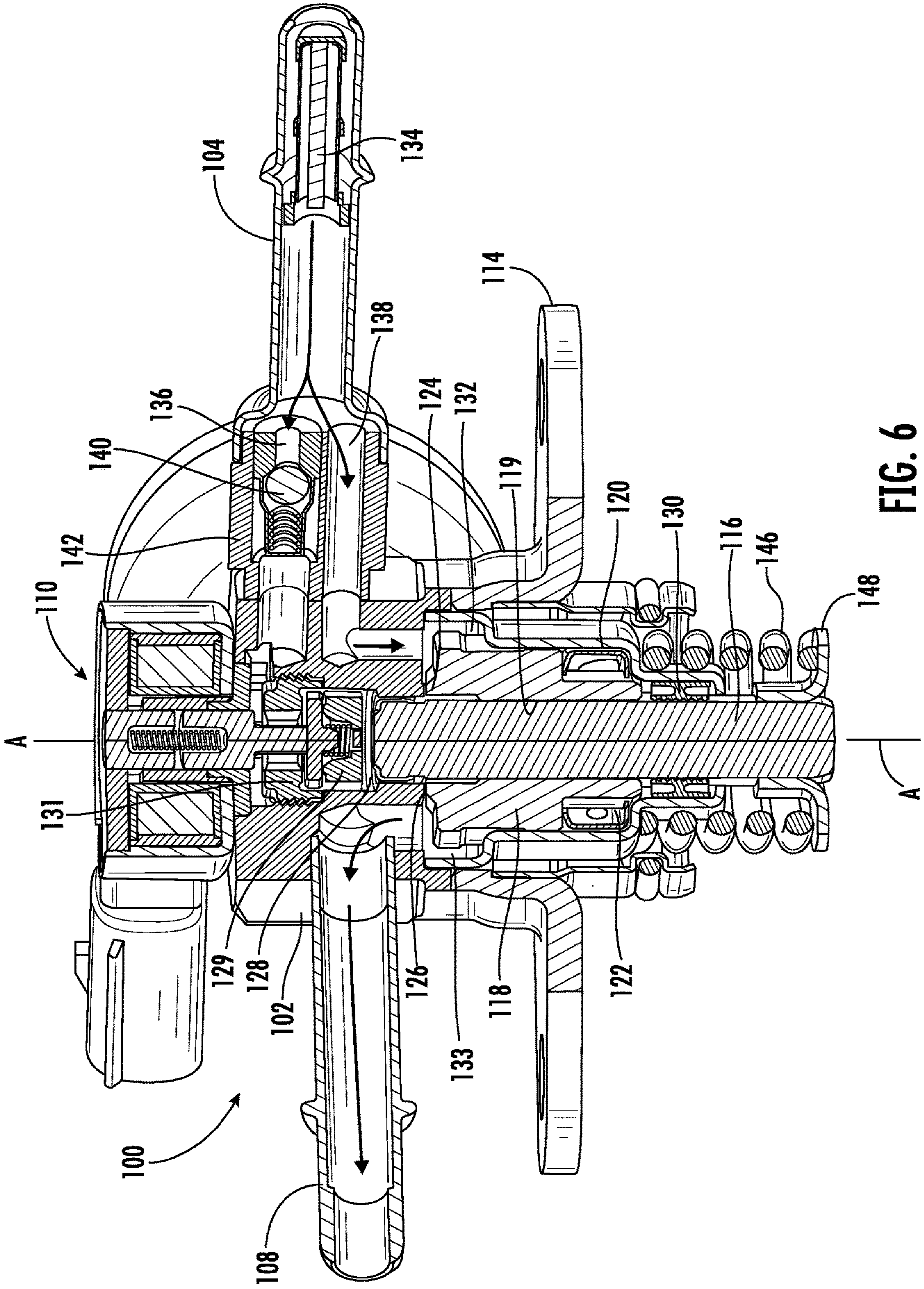
FIG. 6 is a vertical sectional view of the high-pressure fuel pump of FIG. 5 taken along two planes intersecting at a vertical axis of the pumping plunger and bore.

FIG. 6 is a sectional view of the pump of FIG. 5, taken along planes that intersect at a longitudinal axis A-A of the pump 100 and bisect the low-pressure fuel inlet 104 and the low-pressure fuel outlet 108. The pump 100 is a single plunger pump similar to that described in U.S. Pat. No. 8,579,611, commonly owned by the assignee of this application, the contents of which is hereby incorporated in its entirety. The pumping plunger 116 is reciprocated within a pumping sleeve 118 by a cam mounted to an engine shaft (not shown). The pumping sleeve 118 defines a plunger bore 119 and is secured to the pump body 102 by a sleeve retainer 120 welded to the pump body 102. A resilient load ring 122 is situated between a shoulder on the sleeve retainer 120 and a shoulder on the pumping sleeve 118. The load ring 122 and sleeve retainer 120 are configured to bias a sealing rim 124 of the pumping sleeve 118 against a sealing surface 126 on the pump body 102 surrounding a pumping chamber 128. The force applied by the load ring 122 to the pumping sleeve 118 ensures a seal at the interface of the sealing rim 124 of the pumping sleeve and a sealing surface 126 of the pump body 102 that will contain fuel pressurized in the pumping chamber 128. FIG. 6 shows that the pumping chamber 128 extends axially along the pumping plunger 116 and is at least partially defined by the pumping sleeve 118. An upper limit of the pumping chamber 128 is defined by the area surrounding a valve stop 129 and extends to a valve seat 131. The sleeve retainer 120 also supports a plunger seal 130 that prevents fuel from leaking out of the pump 100. A seal chamber 132 extends above the plunger seal 130 between the sleeve retainer 120 and the pumping sleeve 118 and includes an annular space 133 between the upper end of the pumping sleeve 118 and the upper end of the sleeve retainer 120. Although a load-ring mounted plunger sleeve 118 is described with regard to GDI pump 100, other means of providing a plunger bore may be used, such as press-fitting a plunger sleeve into the pump body or machining the plunger bore in a unitary pump body.

The low-pressure fuel inlet 104 includes a filter 134 to remove particulates and defines two flow paths 136 and 138. Flow path 136 communicates with an intake region of the inlet control valve 110 and includes a check valve 140. Flow path 138 communicates with the seal chamber 132. Check valve 140 closes against fuel flowing back toward the low-pressure fuel inlet 104 when the control valve 110 is open during a pumping stroke of the plunger 116, effectively preventing the pressure pulses from propagating back toward the low-pressure fuel inlet 104 or in low pressure flow path 138. This check valve 140 replaces a check valve that would otherwise be required in the low-pressure fuel line between the low-pressure fuel supply pump and the GDI pump 100 to prevent pressure pulses from propagating in the fuel line. Providing check valve 140 in the GDI pump 100 allows the check valve to serve this function and isolate the low-pressure fuel flow path through the GDI pump 100 to low pressure outlet 108. Containing the check valve 140 and divided low pressure fuel flow paths within the pump simplifies the fuel system piping and reduces locations for fuel leaks. According to aspects of the disclosure, the check valve 140 is arranged in a cylindrical fitting 142 that is secured to the pump body 102 by press-fitting or welding. This allows the check valve 140 to be installed in the fitting 142 and tested prior to attachment to the GDI pump 100. However providing the check valve 140 in a separate fitting is not required and the check valve may be mounted in a bore in the body 102 of the pump 100.

Figure 7:
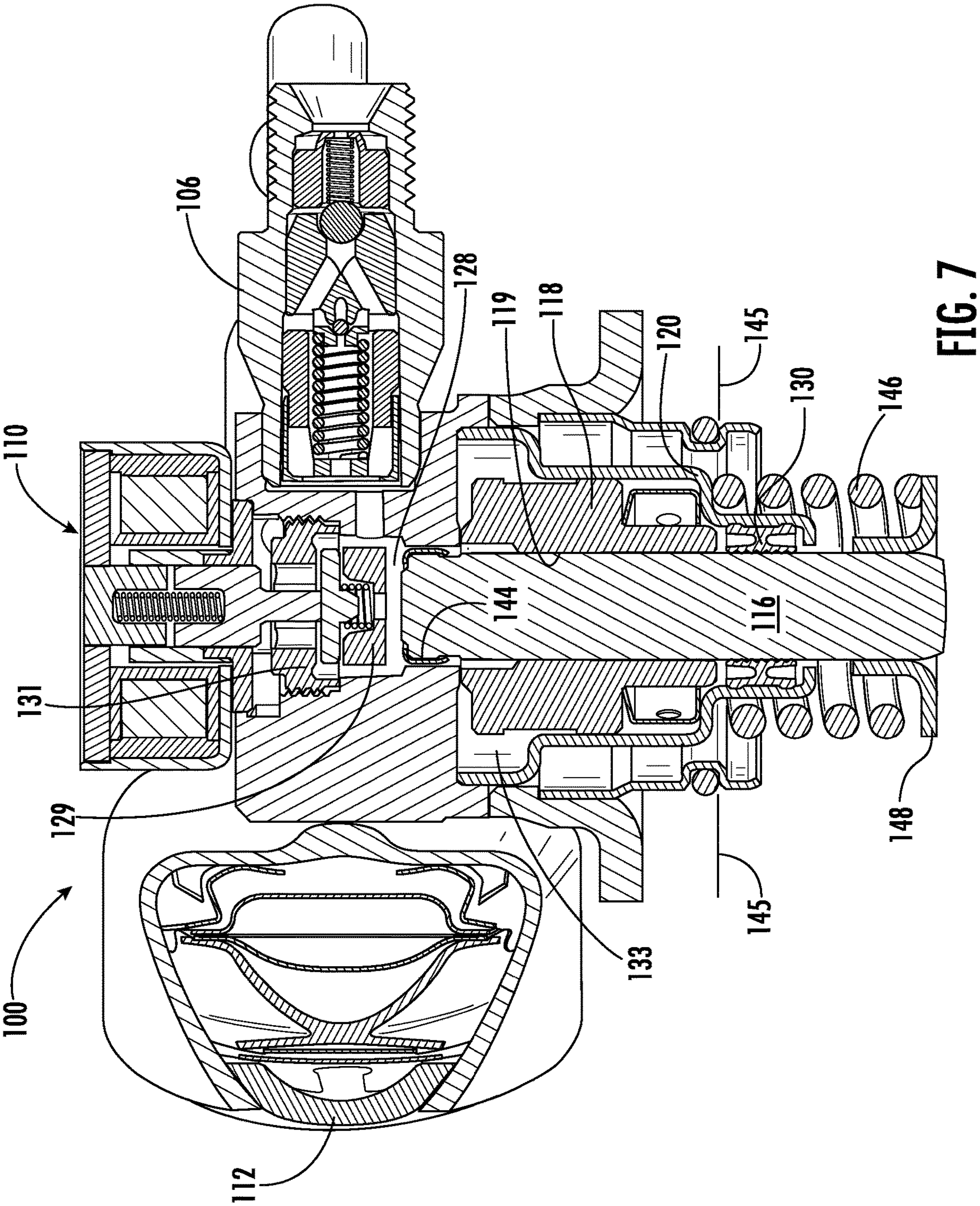
FIG. 7 is a vertical sectional view of the high-pressure fuel pump of FIG. 5, taken along a plane that bisects the inlet control valve, pumping plunger and high-pressure outlet of the pump.

FIG. 7 is a longitudinal sectional view through the GDI pump 100 taken along a plane that bisects the high-pressure fuel outlet 106. The high-pressure fuel outlet 106 includes a combined outlet check valve and pressure relief valve similar to that described in commonly owned U.S. Pat. No. 8,132,558. The structure and function of combined outlet check and pressure relief valves are well-understood and will not be described further.

A constant diameter pumping plunger 116 may slip out of the plunger bore 119 before the GDI pump 100 is mounted to an internal combustion engine. To prevent this, a cap 144 is snap fit over the pumping end of the plunger 116. The cap has an outside diameter slightly larger than the inside diameter of the plunger bore 119 defined by the plunger sleeve 118. Other than retaining the plunger 116 in the plunger bore 119 and occupying a small volume of the pumping chamber 128, the cap does not alter operation of the GDI pump 100.

Figure 8:
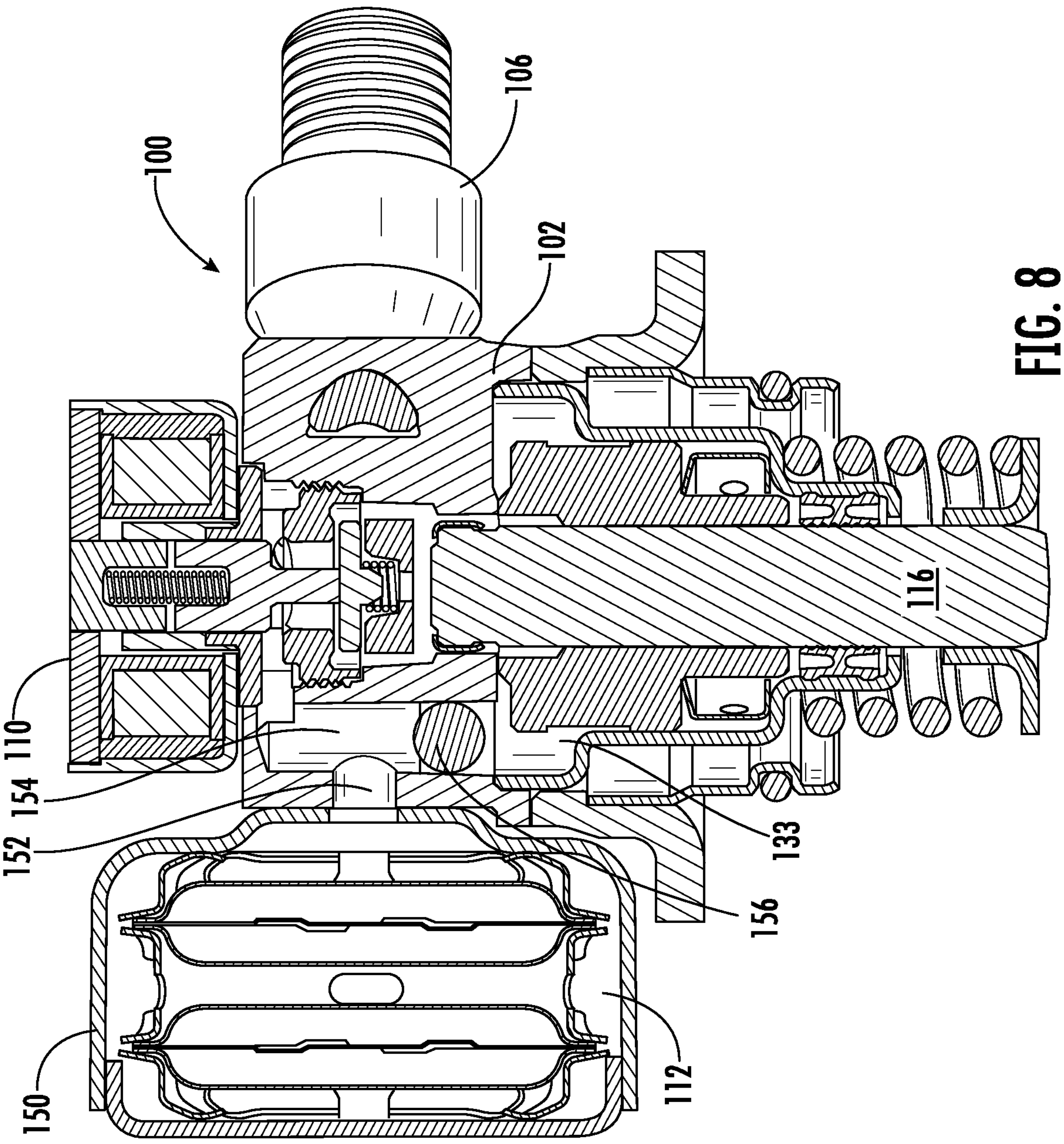
FIG. 8 is a vertical sectional view of the high-pressure fuel pump of FIG. 5, taken along a plane that bisects the inlet control valve, pumping plunger and damper chamber of the pump.

As illustrated in FIGS. 6-8, the plunger sleeve 118 extends axially toward the plunger seal 130 to provide an axially extended interface between the outside diameter of the plunger 116 and the inside surface of the plunger bore 119. This axially extended interface supports the plunger 116 against side loads imposed on the plunger during reciprocation and reduces undesirable scuffing and wear on the pumping plunger 116 and plunger bore 119. In the disclosed GDI pump 100, the lower end of the plunger sleeve 118 is at roughly the same axial position 145 as the outward projecting shoulder of the sleeve retainer 120 against which the plunger return spring 146 is seated. The plunger return spring 146 is captured between a spring seat 148 at the driven end of the plunger 116 and the shoulder of the sleeve retainer 120.

FIG. 8 is a longitudinal sectional view through the GDI pump 100, taken in a plane that bisects the damper chamber 112. The illustrated damper chamber 112 includes two dampers as described in commonly owned U.S. Pat. No. 9,243,623. Although two dampers are shown, more or fewer dampers can be used depending upon the pumping capacity of the pump and other factors. The size and other properties of the dampers may be varied as needed to ensure chamber 112 and dampers in GDI pump 100 are configured to absorb fuel pushed back toward the inlet from the pumping chamber 128 because little or no fuel can flow past check valve 140. The damper chamber 112 is defined by a damper housing 150 welded to the pump body 102. A passage 152 connects the damper chamber 112 to the low-pressure intake side of the inlet control valve 110. A bore 154 in the pump body 102 connects a recess in which the inlet control valve 110 is mounted with the passage 152 leading to the damper chamber 112. Bore 154 is formed from the bottom of the pump body 102 and would undesirably communicate with the annular space 133 that is part of the seal chamber 132. A ball 156 is press fit into bore 154 to separate the low pressure side of the high-pressure pump from the seal chamber 132 and low-pressure fuel flow path to the low-pressure outlet 108. The low-pressure fuel flow path extends from inlet 104, through passage 138 to the seal chamber 132, and annular space 133 to low-pressure outlet 108. The check valve 140 and ball 156 separate the low-pressure fuel flow path from the low-pressure inlet side of the high-pressure pump.

Figure 9:
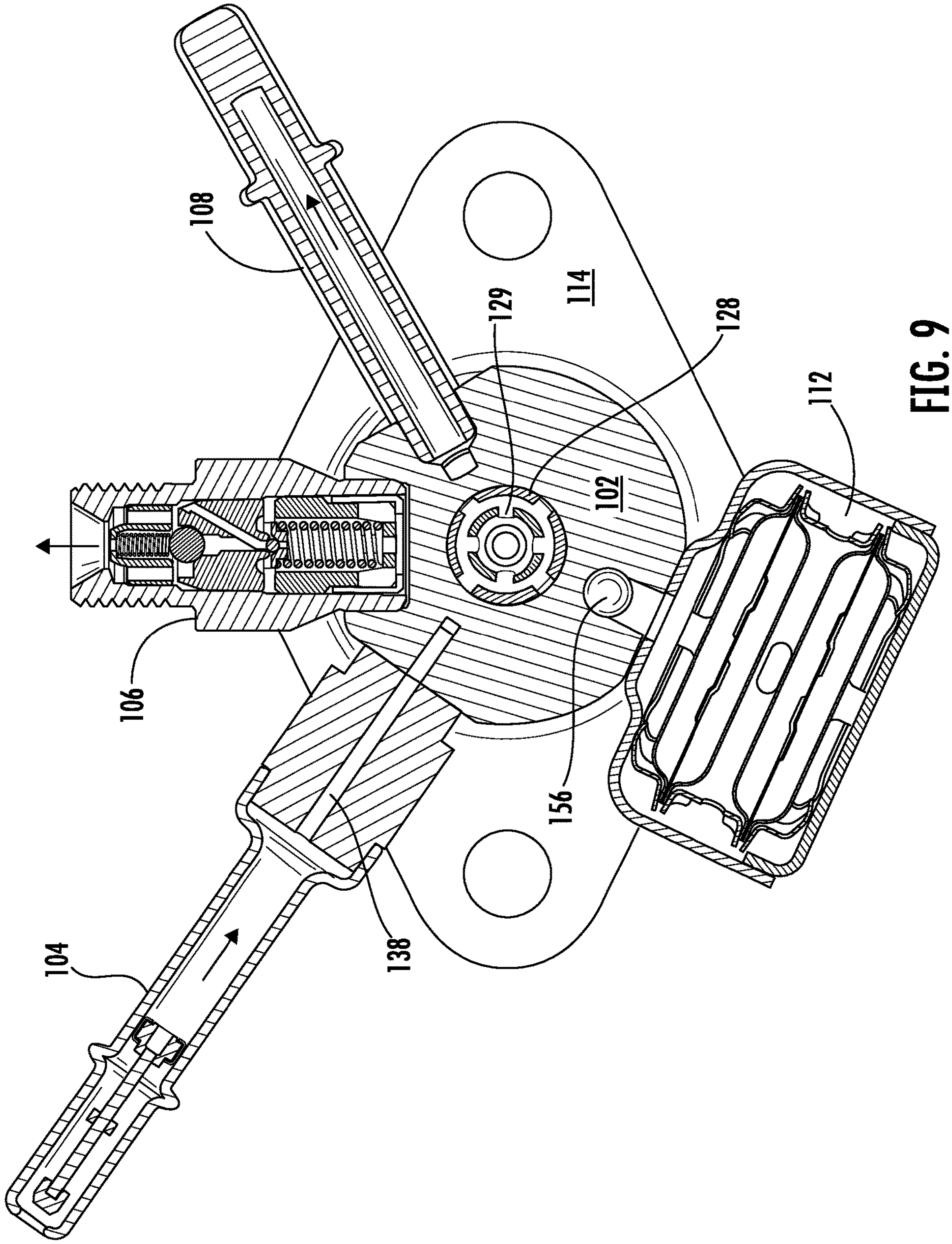
FIG. 9 is a horizontal cross-section of the high-pressure fuel pump of FIG. 5, taken along a plane that bisects the low-pressure inlet, high pressure outlet, low pressure outlet and damper chamber of the pump.

FIG. 9 is a horizontal sectional view through the GDI pump 100 taken in a plane that intersects the low-pressure inlet 104, the high-pressure outlet 106, the low-pressure outlet 108 and the damper chamber 112. The low-pressure inlet passage 138 is fluidly separated from the low-pressure side of the high-pressure pump by check valve 140 (not shown in this view) and ball 156. A dedicated low-pressure fuel flow path is defined through the pump body 102 from low-pressure inlet passage 138 to low-pressure outlet 108 which is not subjected to pressure pulsations present at the inlet side of the high-pressure pump and in the damper chamber 112.

What is claimed:

1. A high-pressure fuel supply pump for an internal combustion engine fuel system that includes a high-pressure fuel injection apparatus, a low-pressure fuel injection apparatus, a low-pressure fuel supply pump, and a low-pressure feed line extending from the low-pressure fuel supply pump, said high-pressure fuel supply pump comprising:

a plunger reciprocating in a pumping chamber and driven by a cam to generate high-pressure fuel;

a low-pressure inlet connection receiving low-pressure fuel from the low-pressure feed line;

a first low-pressure fuel flow path from the low-pressure inlet connection communicating with a damper chamber and a solenoid driven flow control valve assembly arranged to regulate a quantity of fuel pressurized by the plunger;

a check valve between said low-pressure inlet connection and said first low-pressure fuel flow path, said check valve arranged to close against fuel flow toward the low-pressure inlet connection;

a second low-pressure fuel flow path from the low-pressure inlet connection upstream of the check valve, said second low-pressure fuel flow path communicating first with a low-pressure seal chamber region around the plunger and then to a low-pressure fuel outlet; and wherein the second low pressure fuel flow path is fluidly separated from the damper chamber and the flow control valve between the low-pressure inlet connection and the low-pressure fuel outlet, and low-pressure fuel is circulated through the low-pressure seal chamber before leaving the fuel supply pump at the low-pressure fuel outlet.

2. The pump of claim 1, wherein said plunger has a high-pressure sealing diameter D in a plunger bore and a low-pressure sealing diameter d where the plunger extends through a plunger seal and the diameter D is equal to diameter d.

3. The pump of claim 1, wherein said plunger has a high-pressure sealing diameter D in a plunger bore and a low-pressure sealing diameter d where the plunger extends through a plunger seal and the diameter d is less than 30% smaller than diameter D.

4. The pump of claim 1, wherein a restricted orifice is arranged in the low-pressure fuel outlet.

5. The pump of claim 1, wherein said plunger reciprocates in a plunger bore defined by a pumping sleeve secured to a body of the pump, said pumping sleeve at least partially defining the pumping chamber, said seal chamber region surrounding said plunger and pumping sleeve.

6. The pump of claim 1, wherein pressure pulsations at the low-pressure fuel outlet are less than 10 Kpa peak to peak.

* * * * *